April 29, 1952  R. R. SHAW  2,594,358
SYSTEM AND APPARATUS FOR SELECTIVE PHOTOGRAPHING
Filed April 24, 1950  6 Sheets-Sheet 1

INVENTOR
R.R.SHAW
BY
ATTORNEY

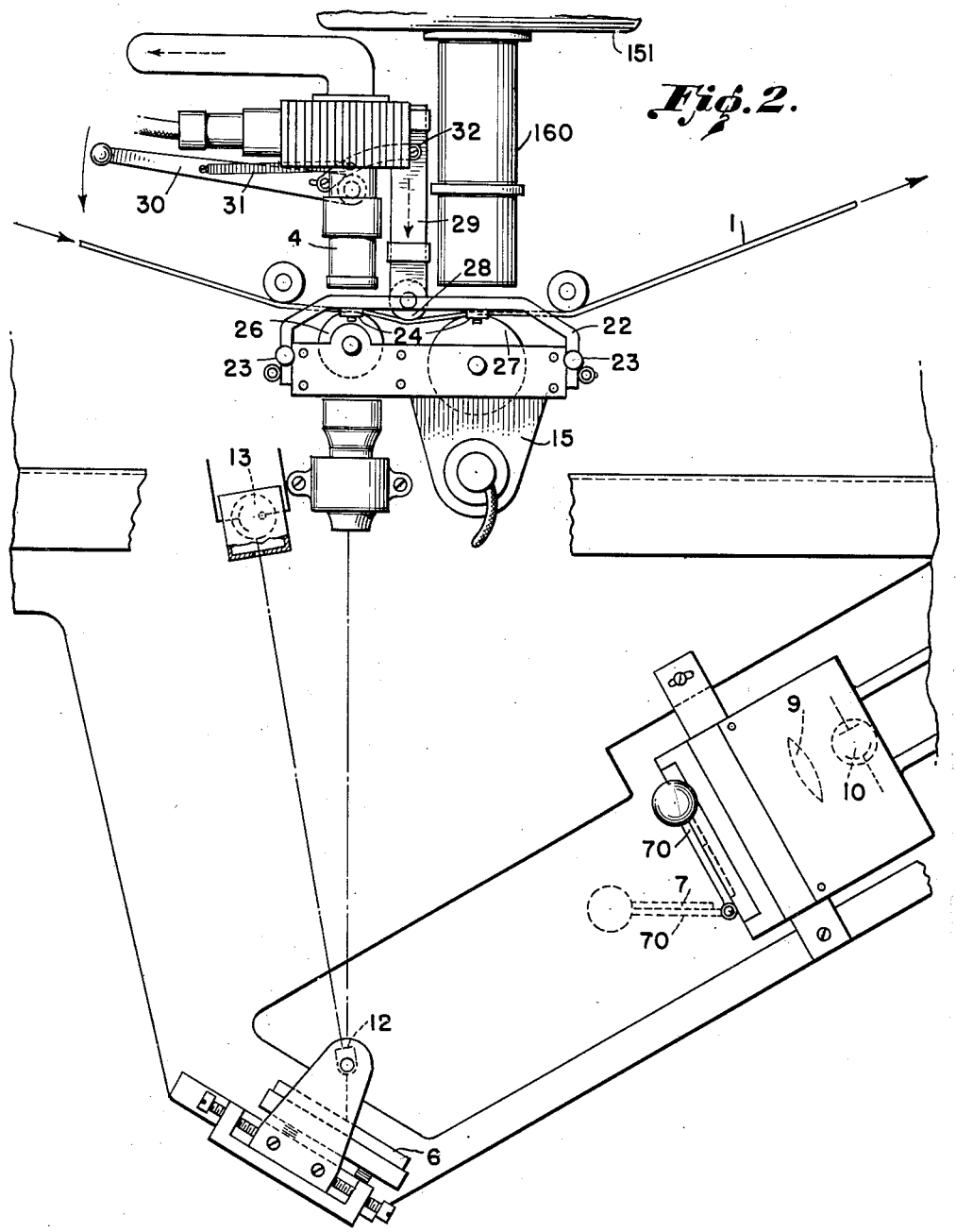

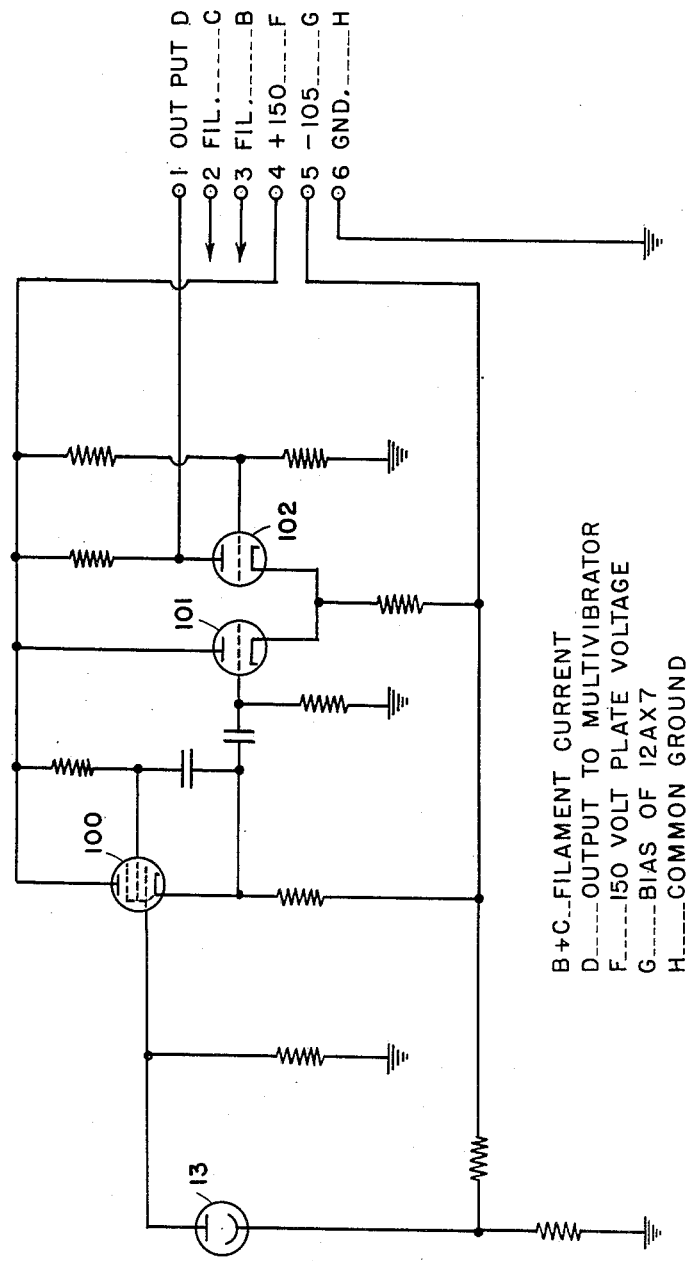

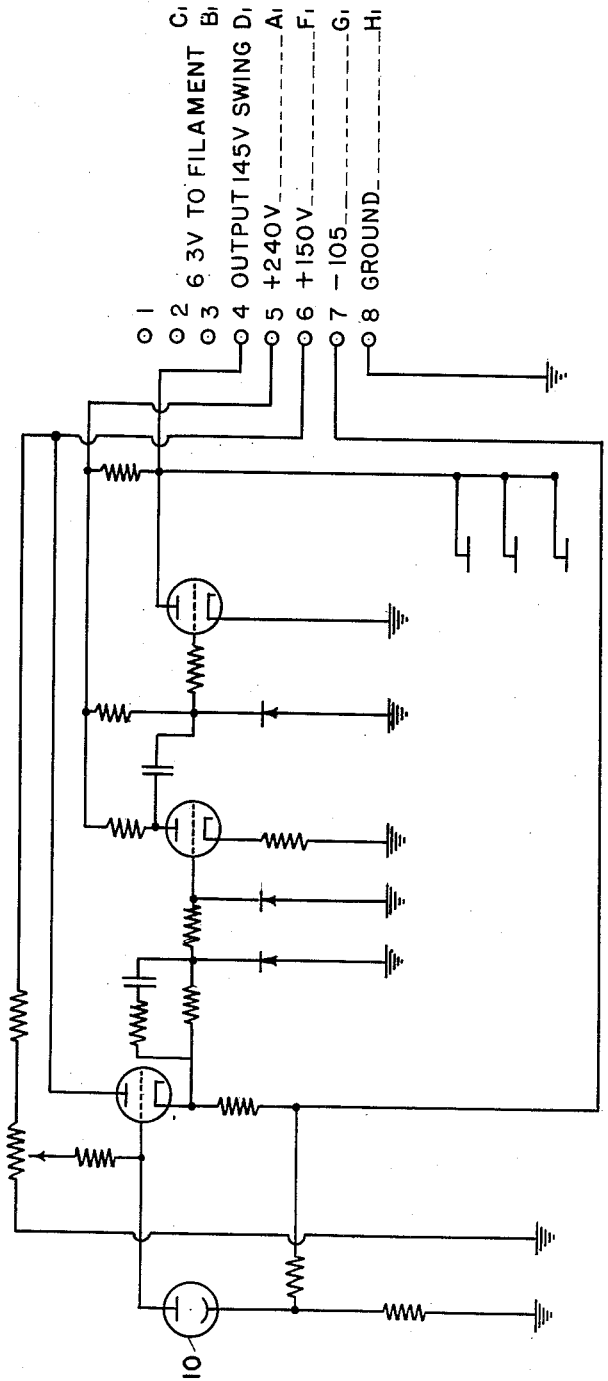

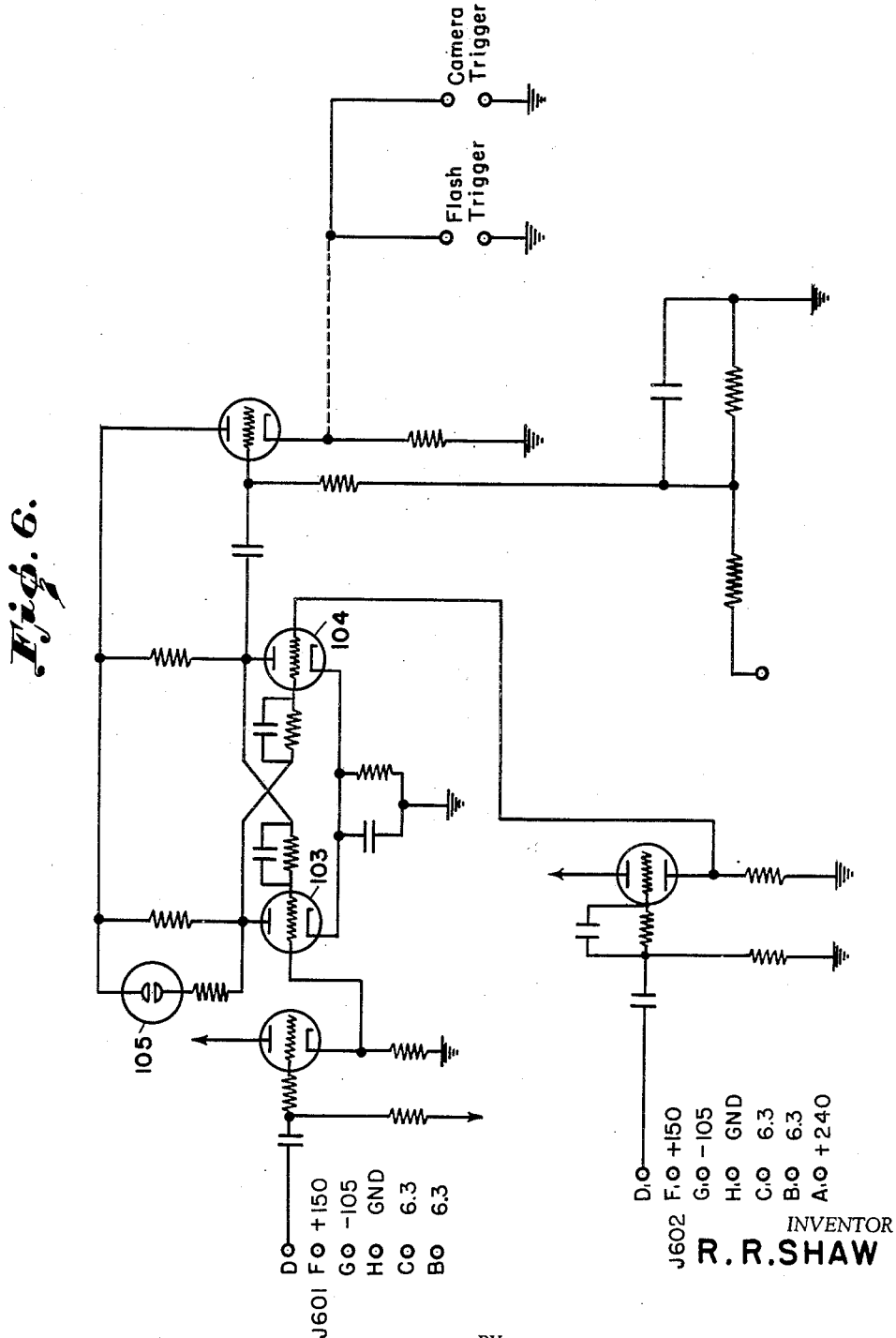

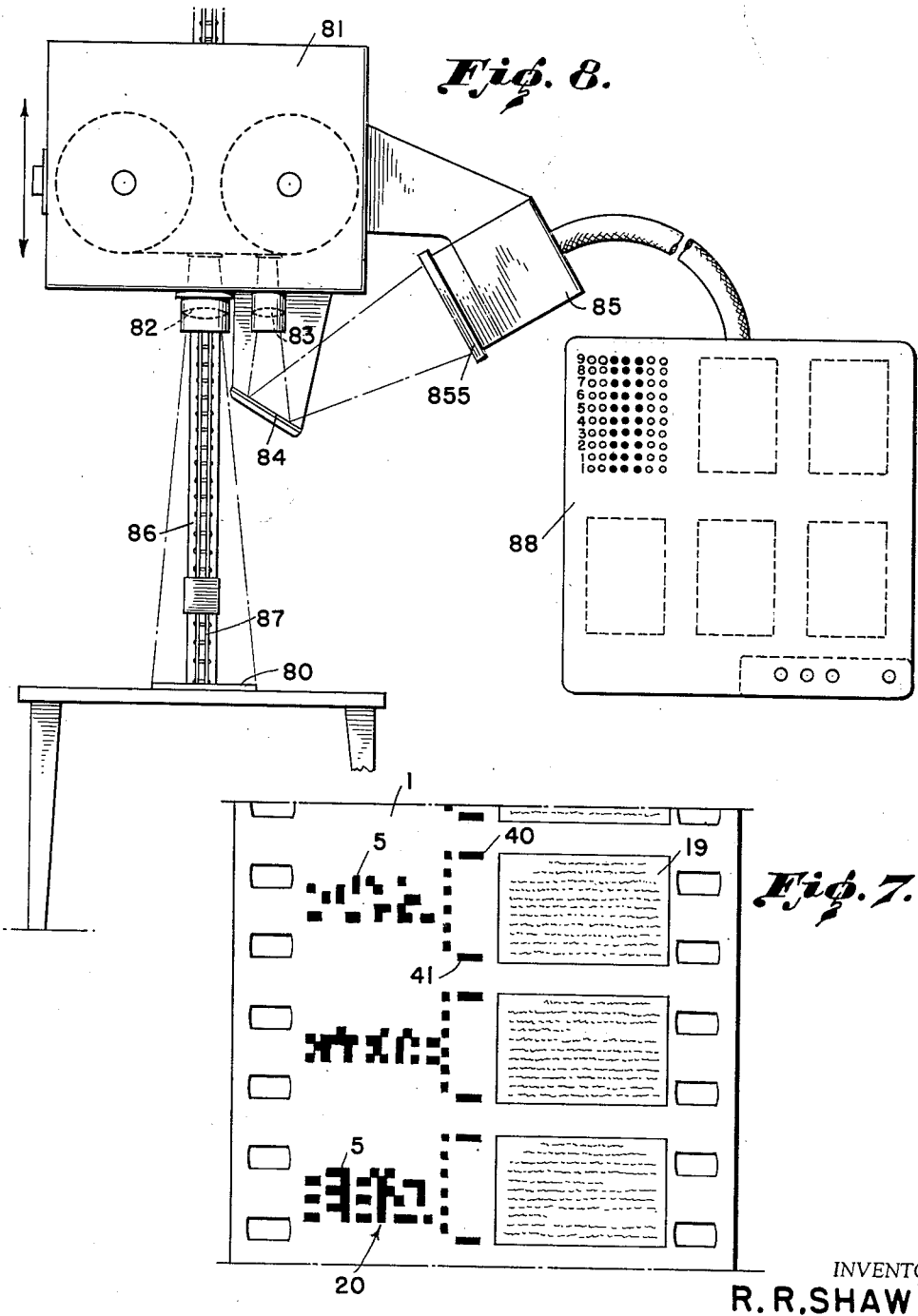

Patented Apr. 29, 1952

2,594,358

UNITED STATES PATENT OFFICE 2,594,358

SYSTEM AND APPARATUS FOR SELECTIVE PHOTOGRAPHING

Ralph R. Shaw, Washington, D. C., assignor to the United States of America as represented by the Secretary of Agriculture Application April 24, 1950, Serial No. 157,839

1 Claim. (Cl. 88—24)

(Granted under the act of March 3, 1883, as amended April 30, 1928; 370 O. G. 757)

The invention herein described may be manufactured and used by or for the Government of the United States of America for governmental purposes throughout the world, without the payment to me of any royalty thereon.

This invention relates to a method and apparatus for preparing a microfilm record having an intelligence track, comprising a series of intelligence frames, and having a code track provided with a multiple set of codes calling for, or corresponding to, the same intelligence frame. It also relates to a system for selectively photographing intelligence frames, or subjects, called out by a selector mask plate, or film, presenting the code corresponding to the selected subject.

Heretofore the design of electronic selectors permitted the provision of only one code for each intelligence abstract or frame, because the abstract had to be positioned under the lens of the stroboscopic camera at the instant that the corresponding code actuated the light flash. It was not possible to provide multiple sets or sections of codes for each intelligence frame or abstract because the abstract would not generally be centered in position under the lens when the code areas flashed the light. For example, where six sections of code are provided for and correspond to the same abstract, anyone of which code sections might actuate the flash lamp, the flash could occur with the abstract located in any one of six positions.

The selector system is designed to call out or photograph a micro-subject frame when any one of the six code sections of the code frame corresponding to the said subject frame is reached. To do this, and at the same time to provide for proper positioning and centering, at the copying lens, of the subject frame called for by the selector, is the problem involved here. This is accomplished by providing a triggering dot for each code frame. Two opaque triggering dots are shown, in order that the film may be run in either direction.

When any one of the six code sections of a frame corresponds to a selector mask it energizes the triggering dot photocell operated circuit. When the opaque triggering dot of that frame intercepts the light to the triggering dot photocell, the copying light is made to flash. Since the copying light is flashed only by the triggering dot, the frame is always centered under the copying lens at the instant of flash no matter which one of the six code sections of the frame calls for the picture.

One form of the invention is illustrated in the drawings, in which:

Figure 2 is a face view of an apparatus embodying the principles of the apparatus of Figure 1;

Figure 3 illustrates the single subject selector code mask;

Figure 4 is the amplifying circuit of the trigger dot photocell;

Figure 5 is the amplifying circuit of the photocell affected by the light rays that pass through the code film and selector mask;

Figure 6 is the multivibrator circuit actuated by the sequential signals of both photocell circuits;

Figure 7 is a magnified view of the microfilm record to be run through the selector;

Figure 8 is an assembly view of an apparatus for photographing subjects and corresponding code on a film, to make the microfilm record of Figure 7.

Figure 1:
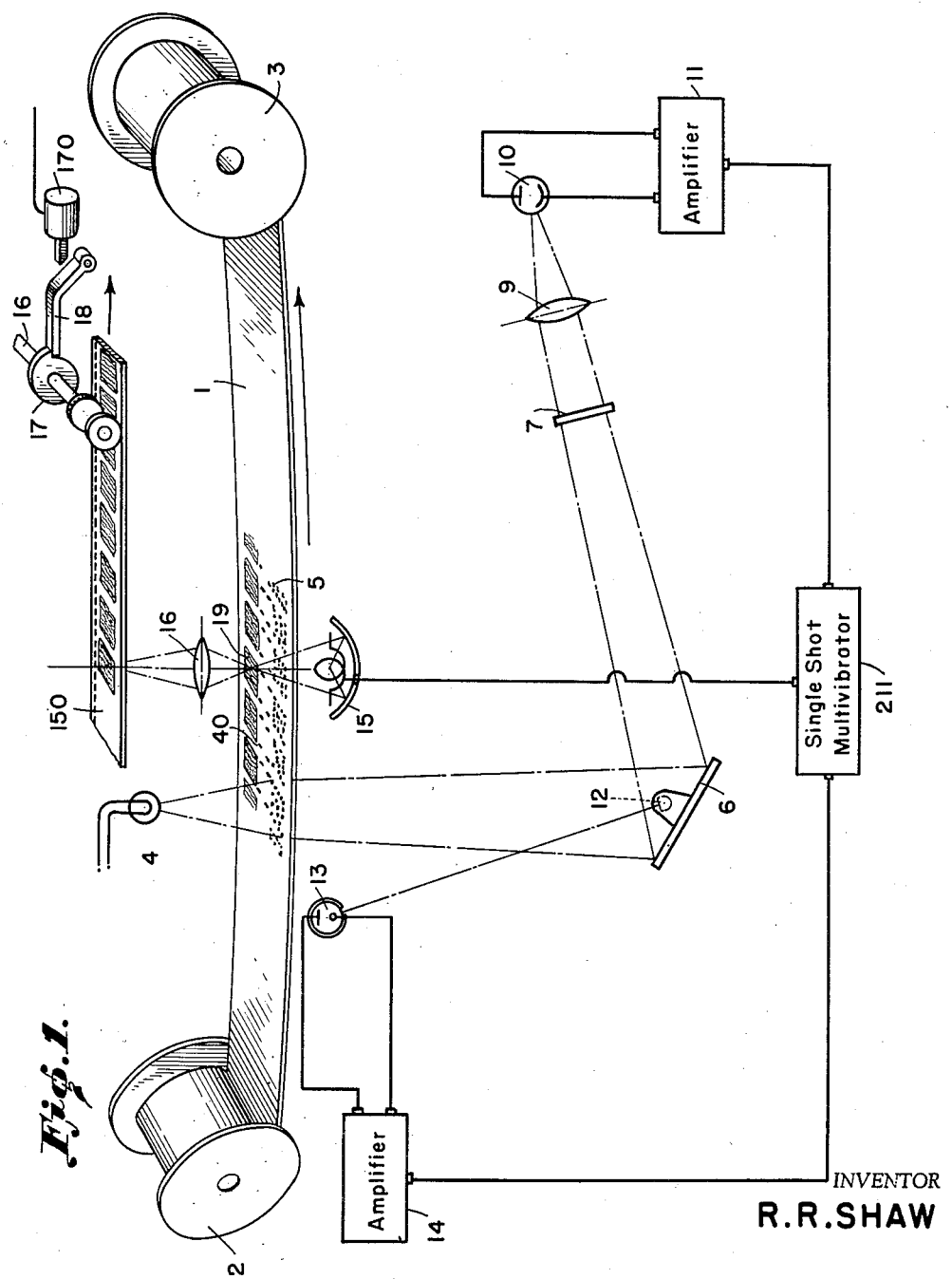
Figure 1 is a schematic or diagrammatic view of the apparatus.

The microfilm record 1, shown in enlarged detail in Figure 7, is mounted by reels 2 and 3. The film 1 passes under steady light 4, the light from which casts the image of the opaque code dots 5 upon reflecting mirror 6 and thence upon single subject selector mask 7. If the arrangement of the light opaque dots of any one of the six code sections should match or coincide with the arrangement of light openings 8 on the single subject selector mask 7, shown in detail in Figure 3, no light will pass through openings 8. Consequently, condensing lens 9 will have no light rays to converge upon photoelectric cell 10. A bank of cells can be employed at 10 to provide a stronger signal. When cell 10 is thus de-energized, the amplifier unit 11 is energized and conveys an amplified signal to single shot multivibrator 211. The multivibrator does not set in motion the copying system until it receives a signal from the trigger dot.

The light from steady light 4 casts the image of the opaque trigger dot 40 upon small spot reflector 12, which reflects the image of the opaque dot upwardly to the left to the trigger dot photoelectric cell 13. When the trigger dot reaches a predetermined position its shadow falls upon the cell 13. No light or insufficient light passes into cell 13, the reflector 12 being so pre-adjusted. Upon de-energizing of the cell 13, an amplified signal is transmitted from the amplifier unit 14 to the multivibrator 211. The latter actuates the copying flash lamp 15 and the advancing of the recording or copying film 150.

Any conventional mechanism for intermittently advancing the copying film can be employed. For example, torque is applied by a spring (not shown) to shaft 16. The shaft carries ratchet wheel 17. Pawl 18 normally engages a tooth of wheel 17 to hold the shaft in place. When the film is to be advanced, solenoid 170 is energized by the lamp flashing circuit, prior to flashing the lamp. The solenoid temporarily disengages the pawl from the wheel 17, whereupon the said spring moves the film forward one step.

As shown in Figure 7, the microfilm record 1 comprises a series of subject abstract frames 19 along the right edge of the film and a series of code frames 20 along the left edge. Each code frame 20 does not necessarily correspond to the adjacent abstract frame. In fact, it is preferred that each code frame 20 correspond to the subject frame that is about ten frames removed from the corresponding code frame.

Each code frame comprises a number of code sections. Each code section comprises two rows of the opaque code dots 5 extending transversely to the length of the film. The opaque code dots are in a translucent field. The subject frame 19 comprises translucent printed matter in an opaque field.

The selection mask (Figure 3) presents a light opaque field 240 having light passage openings 8. The light from the steady light source passes through the transparent field of the code frames and then through the light openings of the selection mask. The photocell 10 is normally energized, the light normally passing through being sufficient to accomplish this. As stated above, when the code on the selection mask is the same as on a code frame section, the opaque dots of the latter intercept all of the light rays that would normally pass through the openings in the selection mask. The photocell 10 is therefore de-energized. This is not permitted to operate the flash bulb. This is done by the opaque triggering dot 40, the rearward trigger dot, in the running direction of the microfilm in the selector apparatus. The forward trigger dot 41 has no effect on the flash bulb because none of the six code sections has, at that stage, actuated the initial signal.

The light from the flash lamp 15 passes upwardly through the intelligence or subject frame on the record film to copying film 150. A copying enlargement lens 16 images the intelligence section onto the copying film. In Figure 2, the copying lens is in casing 160. The copying film is in housing 151.

Any system of high speed photography can be employed. The use of brilliant flashes of light of a few microsecond's duration is common, see pages 464–466 of Industrial Electronics and Control—by Kloeffler, John Wiley & Sons, N. Y. 1949. However, high speed photography systems employing continuous light may be used, where provision is made for use of a high-speed shutter of mechanical on non-mechanical type.

Figure 4 indicates the amplifier circuit for the trigger dot photocell. Figure 5 illustrates an amplifier unit for the code section operated photocell. Figure 6 is the multivibrator. The legends on the drawings indicate the hook-up of the circuits of Figures 4 and 5 to the multivibrator of Figure 6. Trigger circuits and multivibrators for such purposes are described in textbooks and patents, and are generally known to electronic engineers. See for example, Electronics—Experimental Techniques—Elmore and Sands, McGraw-Hill, 1949, 1st edition, pages 78 to 92 and 334. Note also U. S. Patents 2,492,736 and 2,499,613. The invention is not limited to any particular type of electronic control. A general feature of the multivibrator circuit is the possibility of applying a small outside potential to one of the grids to assist in holding the oscillation frequency in step with the external signal. Then, as the signal from photocell 10 permits the grid of the controlled tube to come near the critical voltage, the small additional voltage from the external signal of trigger photocell 13 will cause the tube to trip at the correct time and, through the conventional strobotron (not shown), operate the copying flash lamp circuit and the camera trigger.

The electrical elements of Figures 4, 5, and 6 are conventionally symbolized. In Figure 4 is shown an amplifier for photocell 13 including a pentode 100 and two 12AX7 triodes 101 and 102. The output plug D is connected to the upper plug D of Figure 6. In Figure 5 is shown an amplifier for photocell 10; the output $D_1$ of this circuit is connected to lower plug $D_1$ of Figure 6. In Figure 6, the triodes 103 and 104 are the 67N7 tubes. Element 105 is a rectifier. The voltages are direct current.

Figure 2 is a detailed view of a machine embodying the principles illustrated in Figure 1. The main elements are the same. The camera is at 151, the copying flash lamp at 15. The light from the steady lamp is projected downwardly through the record film and projector to the mirror 6 and the deflector 12 as stated above. A hinged gate 22, pivoted at 23 to be moved toward the viewer, is provided with vertical rollers 24 to accurately position the film. Rollers 24 are adjustable toward and away from the film. In addition to two stationary rollers 26 and 27, a vertically adjustable roller 28 is provided to take up slack equal in length to the distance between the two trigger dots 40 and 41 that call for the same subject frame. Whether in forward motion or reverse, the straight-line path or distance between the subject frame being photographed and the trigger dot that actuates this photographing is therefore the same. The trigger dot doing the actuating is in one pre-determined position with respect to the constant light lamp, the spot reflector, and its corresponding subject frame, in forward and reverse movement of the record film.

The vertically adjustable roller 28 is mounted upon vertical slide 29, which is moved up and down by manual lever 30, through spring 31, and crank 32; or by any other convenient mechanical device.

In Figure 2 the selector mask or card 7 is supported on the hinged plate 70. Condenser lens 9 focuses the light rays upon the photoelectric cell 10.

In Figure 8 is shown an apparatus for preparing the record film. The subject being photographed is at 80. The camera head 81, the two objective lenses 82 and 83, the mirror reflector 84, and the code light bank 85 are mounted upon standard 86 for movement as a rigid unit upwardly and downwardly by chain 87. In this way, the subject being photographed through the lens may be brought into focus by moving the camera head, without affecting the degree of reduction of the code dots on the light bank. The code dots appearing on the record film must be accurately positioned and the degree of reduction in size absolutely consistent. This apparatus obviates the necessity for special preparation of the copy for filming. It copies a wide range of sizes of page, without variation in size of code dots and in the relative position of the trigger dots.

The light bank presents a set of squares that are lit up by operation of the electrical selector keyboard.

This keyboard selector 88 is old and is not part of this invention. Obviously the code light bank is here the equivalent of a punch card with an illuminating lamp to project light through the card to the reflector 84, or directly from the card to the lens. Element 85 is here representative also of a punch card holder and light source, the punch card being held in place at 855.

By using two or more preselectors masks arranged in sequence in the direction of the record film, each actuating the next preselector, the triggering dots can be used to actuate the preselectors, and finally, if all of the preselectors have been actuated, to flash the camera. For example, assume the first preselector is set for Illinois, the second for agriculture, the third for research. The first preselector will scan all six areas. If the code for Illinois appeared, the triggering dot would actuate the second pre-selector. The second preselector would scan all six areas and if the code for agriculture appeared the triggering dot would actuate the third preselector. If the code for "research" appeared, as the code area passed the third preselector, the triggering dot would operate the flash camera. If any of the elements did not appear, the abstract would pass through without being copied.

It is to be understood that the invention is not limited to use of electronic controls. Where very high speed operation is not required, a conventional electrical switch having a dual control operated solenoid actuated by both photocells, may be used.

Having thus described my invention, I claim:

An apparatus for selectively photographing the subject matter presented in a microfilm record, the microfilm presenting a longitudinal series of subject frames and a longitudinal series of code frames providing a code frame for each subject frame, each code frame having at least two code sections, each code section comprising at least one transverse line of opaque code dots on a transparent field, and an opaque trigger dot for each code frame, the subject frame corresponding to a code frame being longitudinally off-set therefrom by at least one code frame, comprising: means for mounting the film for longitudinal movement, a light ray source positioned to pass rays through the code frame area of the film, a selector mask for intercepting these rays, the selector mask having code subject light openings on an opaque field, the mask intercepting the rays when the arrangement of these openings coincides with the opaque dots of a code section, a photocell positioned to receive and be energized by any rays passing through the selector mask; the rays from the light ray source also passing through the transparent field about the trigger dots, and a second photocell in position to be de-energized when the image of an opaque trigger dot falls upon it, means actuated by this sequential operation of the photocells to actuate a copying means for the subject frame selected by the selector mask, two longitudinally spaced opaque trigger dots being provided for each code frame, the copying means including a copying light longitudinally off-set from the first light ray source, the distance between the two lights being fixed, and roller means adjustable to lengthen or shorten the path of the film between the lights by a distance equal to the off-set between a code frame and the subject frame corresponding thereto.

RALPH R. SHAW.

REFERENCES CITED

The following references are of record in the file of this patent:

UNITED STATES PATENTS

| Number | Name | Date |
| --- | --- | --- |
| 2,251,998 | Goodale | Aug. 12, 1941 |
| 2,358,051 | Broido | Sept. 12, 1944 |